United States Patent [19]

Catrain et al.

[11] Patent Number: 4,567,092

[45] Date of Patent: Jan. 28, 1986

[54] COMPOSITE MATERIAL AND ITS APPLICATION TO REINFORCEMENT IN INSULATING PANELS

[75] Inventors: Yves Catrain; Claude Guerrier, both of Brignoud; Jacques Revol, Eaubonne, all of France

[73] Assignee: Scal Societe de Conditionnements en Aluminium, Paris, France

[21] Appl. No.: 539,950

[22] Filed: Oct. 7, 1983

[30] Foreign Application Priority Data

Oct. 11, 1982 [FR] France .................................. 82 17333

[51] Int. Cl.$^4$ .......................... B32B 7/00; D03D 3/00; D04B 1/00; D04H 1/00
[52] U.S. Cl. ..................................... 428/246; 428/251; 428/268; 428/265; 428/285; 428/286; 428/287; 428/290; 428/920; 428/921
[58] Field of Search ................ 428/920, 921, 285, 228, 428/227, 246, 251, 268, 265, 286, 287, 290

[56] References Cited

U.S. PATENT DOCUMENTS

| | | | |
|---|---|---|---|
| 3,202,567 | 8/1965 | Muri et al. | 428/921 X |
| 3,305,431 | 2/1967 | Peterson | 428/921 X |
| 3,515,578 | 6/1970 | Tomita et al. | 428/920 X |
| 3,650,300 | 3/1972 | Listner | 428/920 X |
| 3,738,958 | 6/1973 | Paul | 428/920 X |
| 4,061,826 | 12/1977 | Petras et al. | 428/920 X |
| 4,140,831 | 2/1979 | Miller | 428/285 |
| 4,221,835 | 9/1980 | Severus-Laubenfeld | 428/921 X |
| 4,395,453 | 7/1983 | Lines, Jr. et al. | 428/920 X |

FOREIGN PATENT DOCUMENTS 0174244 10/1982 Japan .................................. 428/920

Primary Examiner—George F. Lesmes
Assistant Examiner—Nancy A. B. Swisher
Attorney, Agent, or Firm—Oblon, Fisher, Spivak, McClelland & Maier

[57] ABSTRACT

The invention relates to a composite material comprising an aluminum sheet and a reinforcement associated by a thermofusible composition.

This material is characterized in that the thermofusible composition contains a group of fire-resistant agents and can be fixed on a layer of insulating fibers simply by calendering.

It finds its application in reinforcement of thermal and acoustic insulating panels that must have a good fire resistance and a suitable mechanical resistance.

4 Claims, No Drawings

COMPOSITE MATERIAL AND ITS APPLICATION TO REINFORCEMENT IN INSULATING PANELS

This invention relates to a composite material that is not easily combustible and to the application of this product to the reinforcement of insulating panels.

For thermal and/or acoustic insulation of the walls of a building, most often panels are used which are made up of a layer of relatively thick mineral fiber which performs the insulating function on a wall to which is fixed a thinner layer intended to reinforce said layer and thus give the panels a suitable mechanical resistance while protecting the fiber from infiltration of moisture and vapor coming from the building.

The reinforcement material can be a product such as paper, which is or is not tarpaper, a plaster, a metal, a mineral compound or any other reinforcement, whether it has a continuous surface or is arranged in a network like a fabric. Most often, this material results from the association of several of these products, thereby forming a composite material.

Thus there has been known for nearly 20 years, from French patent No. FR A-1 320 684 "a panel serving to cover the faces of a building and, in particular the roof, comprising particularly, on the one hand, an insulating layer of inorganic fibers, preferably glass fibers and a binder, preferably, a synthetic resin, and on the other hand, an additional coating layer in the form of a panel of light construction, of a sheet or film of resin, metal or the like, of tarpaper or the like. These elements are assembled permanently, preferably by gluing."

However, primarily because of the increasing legal requirements of fire safety, people in the art have been led to make insulating panels in which the use of materials of organic origin has been eliminated, or to seek to reduce the combustibility properties of these latter.

For this reason, in patent application No. 2 460 508 in the Federal Republic of Germany, the use of easily combustible organic glues, is avoided with a silicate and metal oxide based adhesive which is claimed as the means for fixing the layer of insulating mineral fibers to the metal sheet serving as a reinforcement. Certainly, this is progress in the way of fire resistance. However, recourse to a simple sheet has proven to be insufficient to protect the insulation from tears inherent in careless handling. Hence the need to reinforce the mechanical resistance of the panels with composite materials.

To obtain this reinforcement, FRG patent application No. 2 849 246 teaches the incorporation between the insulating mineral fibers and the metal sheet of a reinforcement of felt or glass fabric and fixing it with a silicate base glue. The panels made in this way obviously have improved mechanical resistance and incombustibility. However, they have certain drawbacks. Actually, the mineral glues used to fix the fibers to the reinforcement are relatively fragile and do not lend themselves well to deformations such as rolling or folding, which is required for packaging and shipping of the panels. This defect can be remedied by fixing the insulating fibers, on the one hand, and the metal sheet-reinforcement unit on the other hand, at the sites where the insulation is desired, but then the applicator must have gluing and drying equipment operated by trained personnel and accept certain delays in execution. These are all conditions that greatly increase the cost of the panels.

To avoid some of these difficulties FRG patent No. 3 013 223 specifies the use of another metal sheet placed directly in contact with the insulating fibers so that the problem of direct fixing of the reinforcement on said fibers is eliminated. This concept further offers the advantage of being able to use fiber base reinforcements and organic glues, because these products being enclosed between two metal sheets, are protected from any contact with a possible flame. However, this material requires doubling the amount of metal, which inevitably causes an increase in the cost and does not avoid gluing problems that are impractical.

To avoid the gluing problems, some techniques resort to impregnating the reinforcement with a thermofusible resin so that further fixing of the composite material formed by this reinforcement and the metal sheet on the insulating layer can be performed easily and rapidly on site by simple heating of the material in a calender. Under these conditions, the softened resin attains suitable adhesive properties to assure a correct fixing after cooling. However, the organic products have disadvantages in regard to resistance to fire. Of course, it is possible to come back to the solution of the double metal sheet by disregarding cost, but then it is no longer possible to benefit from the advantages of calendering.

For this reason, the applicant, aware that progress was still possible in the design of insulating panels, sought and found a composite material which can be fixed to an insulating material by calendering and in which the lack of fire resistance of the thermofusible resins can be remedied.

In this material, according to the invention, an aluminum sheet and a reinforcement are associated by means of a thermofusible composition which contains a group of fire-resistant agents.

Elements known in the prior art are found, namely:

an aluminum sheet, with a thickness between 10 and 50 $\mu$m, whose essential role is to prevent moisture or vapors of the installations to be protected from penetrating into the layer of mineral fibers of the insulating panels, which would reduce their insulating properties;

a reinforcement formed by a fabric of glass mono- or multifiber yarn and/or of an organic material such as polyesters with a diameter close to 0.1 mm and, for example, forming meshes of different geometry and of dimensions close to a centimeter. This reinforcement aims at protecting the layer of insulating fibers from all detrimental outside stresses that can occur, particularly during handling which accompanies packaging, shipping and installing the panels.

These elements are associated by a thermofusible composition preferably belonging to the group made up of ethylene copolymers such as, for example, ethylene-vinyl acetate, polypropylene, polypropylene copolymers, but any other thermofusible composition can be used.

According to the invention, this composition contains a group of fire-resistant agents including, either separately or in combination, chloro organic derivatives, bromo aromatic derivatives, mineral fillers, antitoxidizing agents. These agents are selected as a function of their price and availability on the market.

However, some of the groups of fire-resistant agents are able to develop a remarkable synergistic effect at the level of their fire-resistant properties. Thus, for example, the group consists of a chloroparaffin, decabromodiphenyl, a mineral filler made up of alumina trihydrate, antimony trioxide, and an antiodizing agent, has proven to be refractory to fire to such a point that it meets the stiffest fire safety requirements such as those, for example, imposed in the FRG on products in class $A_2$ according to DIN 4102.

Generally, the group of fire-resistant agents represents 70 to 90% by weight of the thermofusible composition used to associate the elements of the composite material.

In practice, the making of this material is as follows: the fire-resistant agents are added, by dispersing them by stirring, to the thermofusible composition kept in the molten state; then, the aluminum sheet and reinforcement are introduced and passed simultaneously through the bath thus formed, and progressively are covered with a film of fire-resistant composition; then the elements thus coated are applied against one another by a suitable device and, after cooling, the composite material is obtained.

Besides the remarkable fire resistance, experience shows that the presence of fire-resistant agents does not alter the characteristics of flexibility and elasticity of the thermofusible compositions and that the material easily lends itself to all operations of rolling and folding, making its packaging in varied forms possible. Also, the adherence properties of the thermofusible composition are maintained so that the composite material thus formed can easily be fixed to a layer of insulating mineral fibers by simple heating with a calender.

Thus, instead of resorting to gluing machines, complex devices that have relatively low production rates because of the periods necessary for impregnation and drying, it suffices to pass the material according to the invention between hot rollers in a suitable way to cause the rapid fusion of the thermofusible composition to assure its almost instantaneous fixing to the insulating layer after contacting and cooling.

This operation can be performed directly at the site where the panels are used, the calender being an apparatus that is easy to operate by an unskilled worker.

The panels thus designed therefore offer the advantages inherent in a process of fixing by thermofusion, without having the defects of any plastic material which are rather easily combustible.

The composite material according to the invention therefore finds it application in fabrication of acoustic and thermal insulating panels intended for the building industry and for which there are required both good mechanical propeties and fire resistance meeting the most demanding safety standards such as standard $A_2$ in force in the FRG.

This application can be extended, because of the flexibility of the material, to making sleeves intended to insulate pipes from ambient effects and any other insulating piece, and as such is suited to the most complex forms of installation.

What is claimed as new and desired to be secured by Letters Patent of the United States is:

1. A composite material comprising:
   (i) an aluminum sheet, and
   (ii) a reinforcement means formed of a fabric of glass mono- or multifiber yarn or an organic material;
wherein the aluminum sheet is bound to the reinforcement means by a thermofusible composition comprising an ethylene copolymer, polypropylene or a polypropylene copolymer; wherein the thermofusible composition further comprises a fire-resistant agent which is at least one member selected from the group consisting of a bromo-aromatic derivative, a chloro-organic derivative, aluminum trihydrate, antimony trioxide and an antioxidizing agent; said fire-resistant agent being used in an amount of 70 to 90% by weight in the thermofusible composition.

2. The composite of claim 1 wherein said ethylene copolymer comprises ethylene-vinyl acetate.

3. The composite of claim 1 wherein said fire-resistant agent comprises a chloroparaffin, decarbomodiphenyl or mixtures thereof.

4. The composite material of claim 1, wherein the said organic material comprises polyester.

* * * * *